Aug. 9, 1966                    W. E. ELDRED                      3,265,554
                   LAMINATED TENSILE LOAD CARRYING MEMBER
                        HAVING LAMINATED END FITTINGS
Filed June 11, 1962                                         4 Sheets-Sheet 1
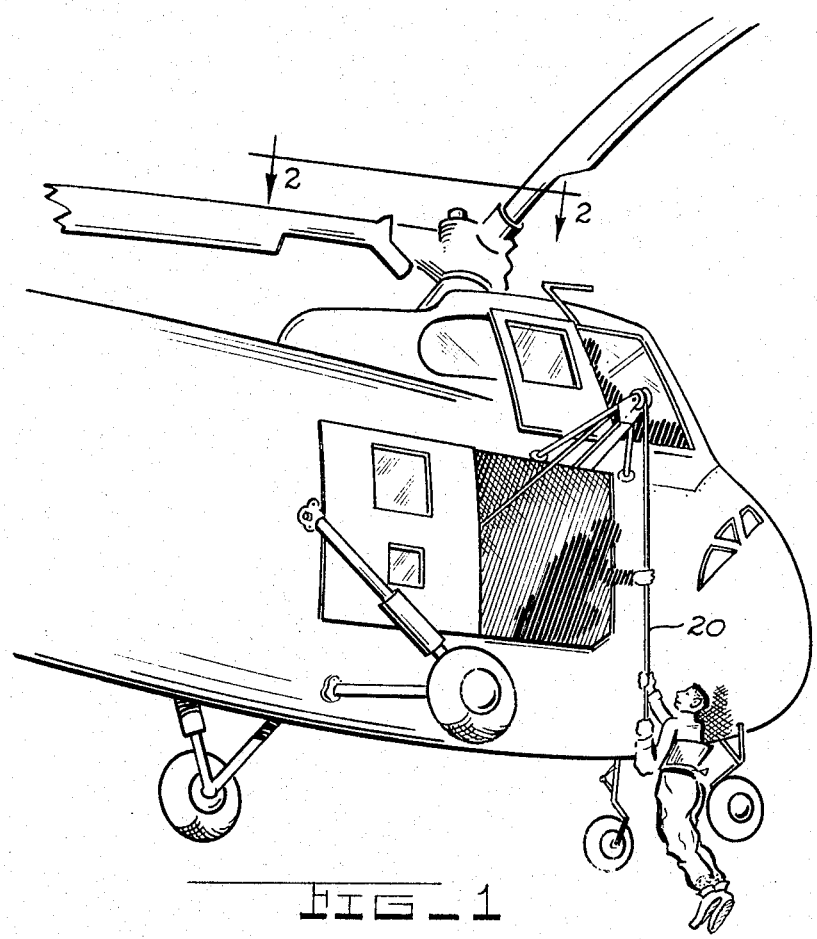
FIG_1
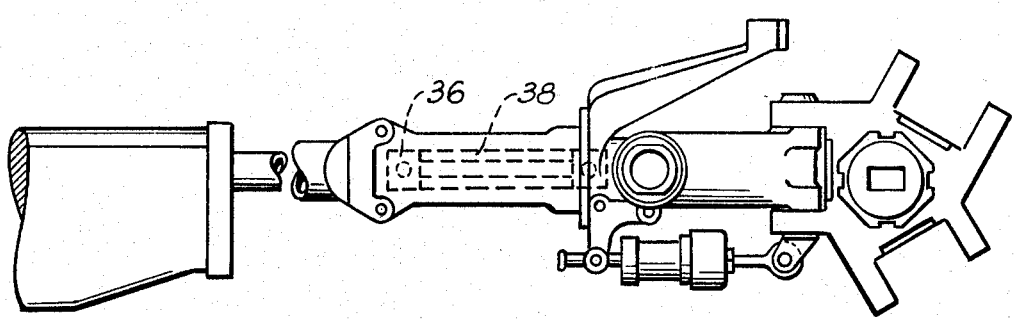
FIG_2
INVENTOR.
WENDELL E. ELDRED.
BY *Cecil F Avery*
ATTORNEY.

Aug. 9, 1966 W. E. ELDRED 3,265,554
LAMINATED TENSILE LOAD CARRYING MEMBER
HAVING LAMINATED END FITTINGS
Filed June 11, 1962 4 Sheets-Sheet 2
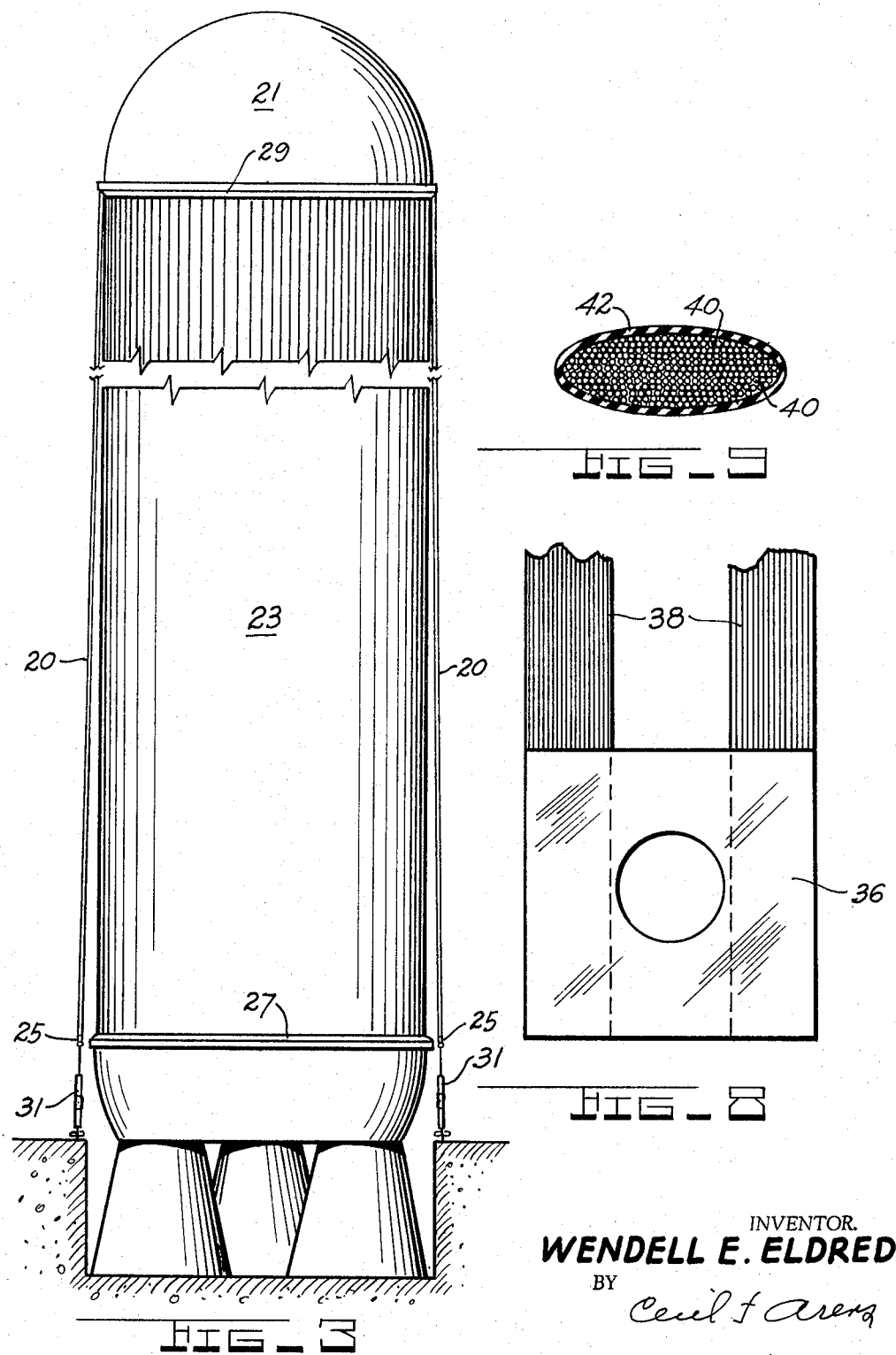
INVENTOR.
WENDELL E. ELDRED.
BY
ATTORNEY.

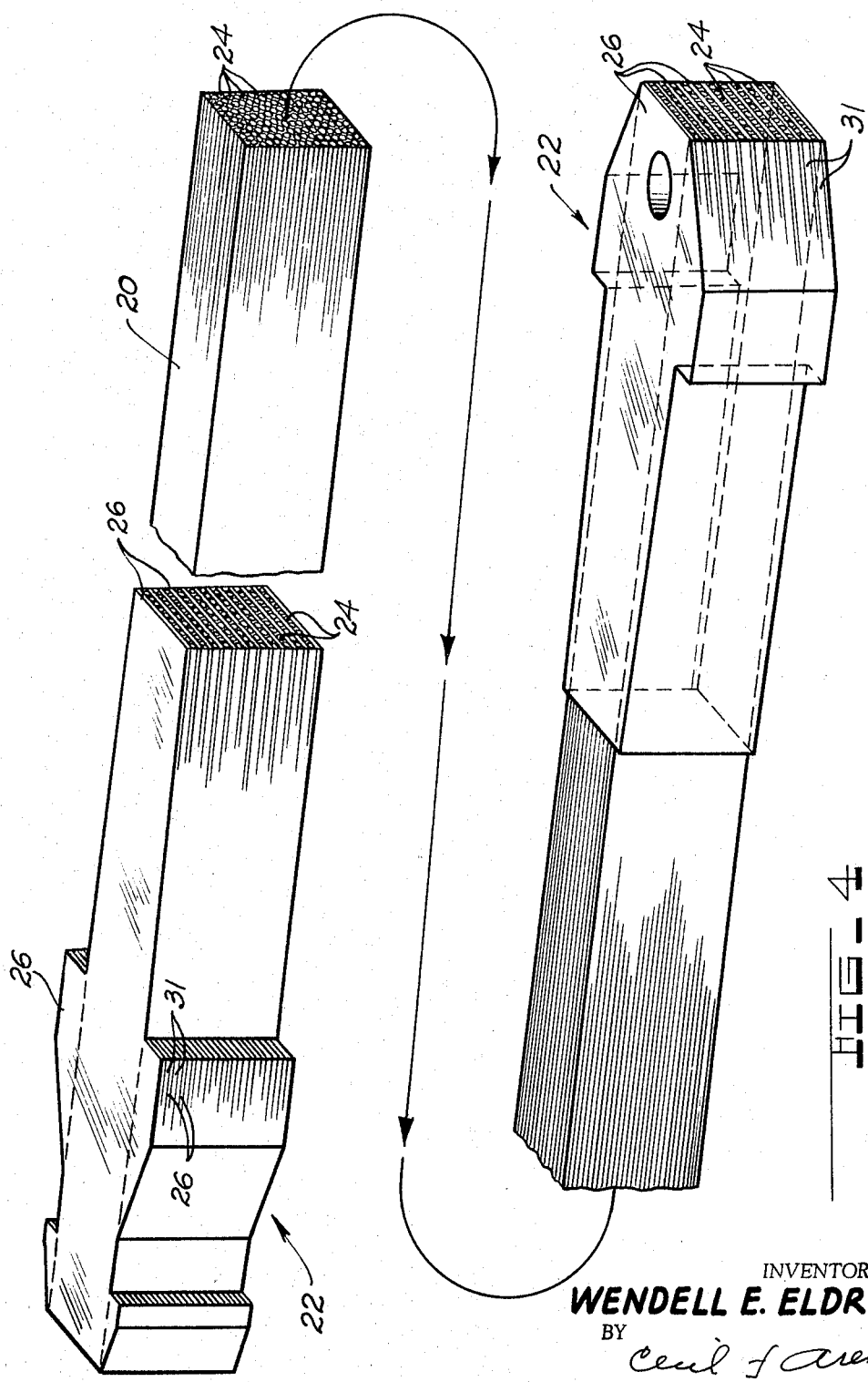

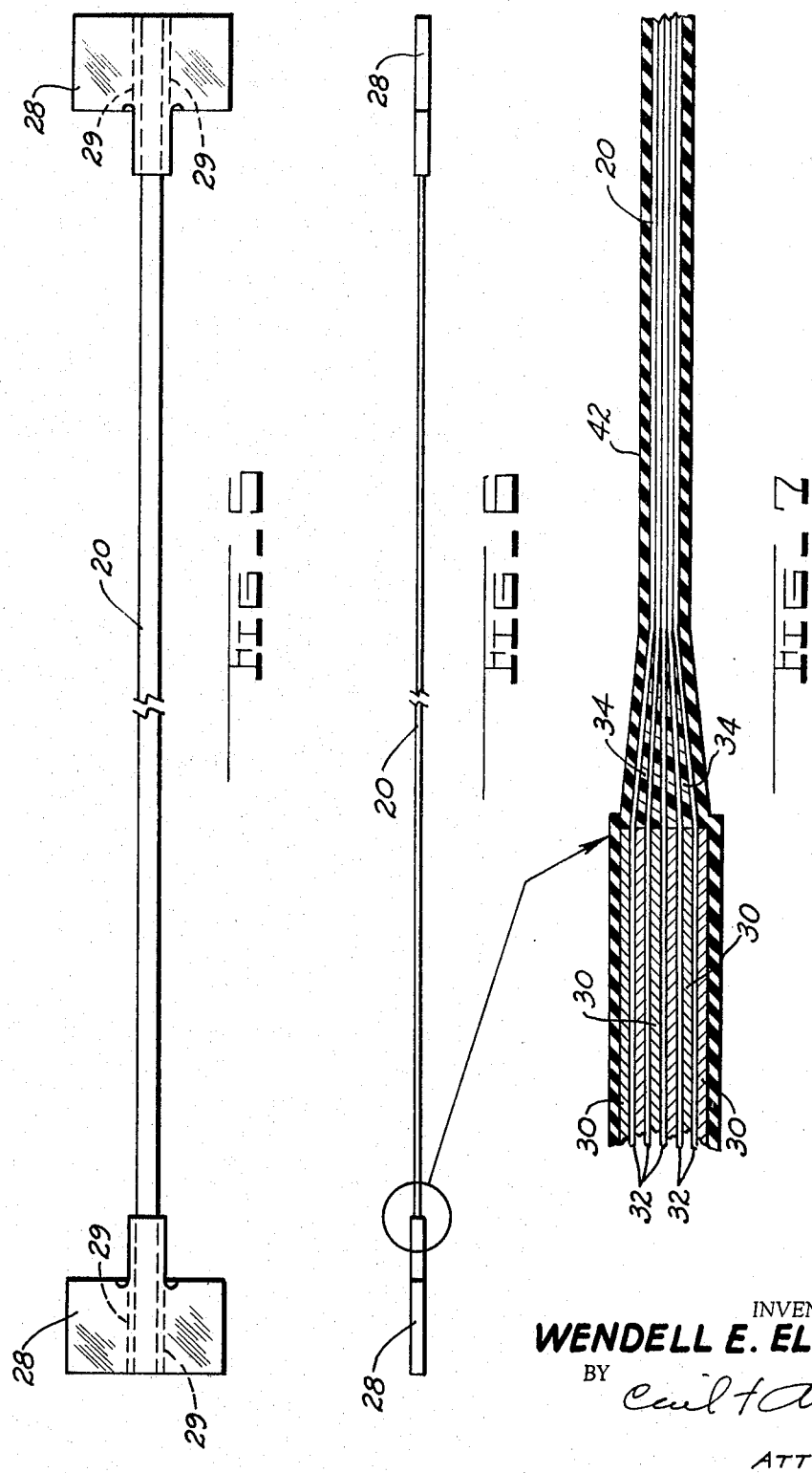

United States Patent Office 3,265,554
Patented August 9, 1966

3,265,554
LAMINATED TENSILE LOAD CARRYING MEMBER HAVING LAMINATED END FITTINGS
Wendell E. Eldred, South Bend, Ind., assignor to The Bendix Corporation, South Bend, Ind., a corporation of Delaware
Filed June 11, 1962, Ser. No. 201,678
1 Claim. (Cl. 161—143)

This invention relates to a laminated article formed of parallel arranged filaments joined with end plates at the ends.

It is an object of this invention to provide a laminated article capable of withstanding high tensile loads.

It is also an object of this invention to provide an article with laminated end fittings.

Another object is to provide an article having laminated end fittings which serve to connect the article to at least one structural member.

Still another object of this invention is to provide an article that may be easily wound and unwound from a reel.

Other and further objects will readily appear to those skilled in the art having reference to the following description and accompanying drawings in which:

FIGURE 1 is a pictorial presentation of one embodiment of my article;

FIGURE 2 is a plan view along line 2—2 of FIGURE 1 showing a tie-bar in phantom constructed from a laminated article according to my invention;

FIGURE 3 is another view showing an environment for my article;

FIGURE 4 is a diametric broken view of an article as provided by my invention;

FIGURE 5 is a plan view of another type of article designed in accordance with my invention showing a different type end fitting;

FIGURE 6 is a side view of the article of FIGURE 5 showing the narrow width which may be realized of high tensile strength members formed from my invention;

FIGURE 7 is an exploded view of the circled detail of FIGURE 6 showing the step down of the laminated article as it leaves the end fitting and the encasement of the structure in a resin;

FIGURE 8 is a showing of the laminated article and end fitting as it may appear in a connection such as depicted by FIGURE 2; and FIGURE 9 is an end view of the laminated article of my invention showing an oval cross section form of laminated layers.

With regard to FIGURES 1 and 2, I have shown two environments to which my invention, namely the laminated article 20, may be applied. For some time now helicopter designers have been pressing for an article such as mine which enables a hoist mechanism within a helicopter to rapidly wind and unwind as well as to reduce the weight attendant to such systems. In addition, present day helicopters have been subjected to severe weight penalties by metal ties between the blade and hub, and this problem can also be eliminated by a construction of my invention in accordance with FIGURES 2 and 8.

In addition, with reference to the embodiment shown in FIGURE 3, my laminated article may be used to hold a nose cone 21 to a booster power plant or similar structure 23, which connection is made by tensioning article 20 until an end fitting 25 can be attached under a slotted ring 27 while the other end is securely held to slotted ring 29 of the nose cone. The means for tensioning can take the form of a mechanical cable jack apparatus 31 used to tighten cables or the like.

As to the particular details of my invention, it is concerned with the laminated construction shown in FIGURE 4, which lamination includes end fittings 22. With reference to FIGURE 4, the laminated article 20 is shown in enlarged form to have a plurality of parallelly arranged filament members 24, which filaments extend the length of the article. At the ends of the article a plurality of plates 26 are interposed with the filament layers. The filament layers are preferably each constructed in accordance with the tape construction of my copending application No. 825,958 filed July 9, 1959, except that the filaments are not to be limited to metallic elements for my present invention has proven to afford desirable properties when glass or plastic filaments are utilized. In any event the parallelly arranged filaments 24 are carried by a plastic or rubbery substance intermediate the end fittings, which substance may constitute the bond between the filaments 24 and plates 26 forming the end fitting. Normally, however, the end fittings and filaments or tapes are bonded by a high strength adhesive. The bearing strength may be increased for each end fitting by inclusion of spacers 31 intermediate the plates in the regions not filled by the filaments or tapes, as the case may be. As seen in FIGURES 4, 5, and 8, the end fittings may be designed to have a wide variety of shapes limited only by the type of connection and strength desired.

With reference to the article 20 presented by FIGURES 5, 6 and 7, I have provided an exaggerated T shaped end fitting 28. This T shaped end fitting is constructed from a plurality of plates 30 and a plurality of tapes 32, which may or may not be filament reinforced and which are bonded together such as by curing the assembly at a preselected temperature which method bonds plastic substance about the filaments. In addition, I have found that the respective layers of the filament tapes may be spaced in the areas intermediate the end fittings 28 by applying additional material such as a low modulus material or one having high elongation characteristics to permit flexure, etc. However, as seen in FIGURE 6, one can have the area intermediate the end fittings only as wide as the tapes, and therefore, I provide a minimum of material 34 adjacent the end fitting, which material may be flexible and/or have a high strength characteristic as discussed above, and which merely serves to taper the tapes from the end fitting width to their joined width intermediate the end fittings.

With reference to the laminated article shown by FIGURE 8, it also is formed of a plurality of flat plates 36 interleaved with tape layers 38, which tape layers are shown to be spaced laterally about an axis. The tape layers may or may not have parallel filaments carried thereby. Such an article finds particular use in tieing a helicopter blade to a rotor hub which connection must carry high tensile loads and in some cases pemits blade twisting when said blade is undergoing pitch change due to aerodynamic loading or commands by a control system. The lateral spacing from the central axis of the tape layers can be controlled to increase or decrease the torsional resistance of such a fitting, and the area intermediate the spaced layers, if any, may be filled with spacers as seen in FIGURE 4.

As for the construction presented by FIGURE 9, I have shown one of many possible cross sectional variations which can be easily attributed to my invention. In this cross section the filament layers 40 are of progressive widths and for added ease of handling, as well as providing edge protection, I show by this figure that the lamination may be encased by a plastic or rubbery member 42 which may also be used to coat the end fittings, as well (see FIGURE 7) to form a stronger bond between the filaments and plates.

As seen by the figures, the end fitting plates may be shaped, drilled or a combination of these to afford a means of joining the lamination with surrounding structure.

It is to be expected that those skilled in the art can make adaptations and revisions as may suit their particular requirements and it is intended that such revisions and adaptations as incorporate the herein disclosed principles will be incorporated within the terms of the following claim as equivalents of the invention.

I claim:

A lamination comprising:
 a plurality of parallel filaments;
 a plurality of layers of said parallel filaments;
 a purality of plates interposed with said layers of said parallel filaments; and
 means bonding said layers of said filaments to said plates including,
 a thermosetting material adhering to both said filaments and said plates between said filaments and said plates and which also encases said layers of said filaments and said plates.

References Cited by the Examiner
UNITED STATES PATENTS

| | | | |
|---|---|---|---|
| 1,900,585 | 3/1933 | Reed | 339—275 |
| 2,275,611 | 3/1942 | Chadbourne | 139—151 |
| 2,571,692 | 10/1951 | Dubois. | |

ALEXANDER WYMAN, *Primary Examiner.*

EARL M. BERGERT, *Examiner.*

G. D. MORRIS, *Assistant Examiner.*